(No Model.) 3 Sheets—Sheet 1.
P. CLINES.
SULKY PLOW.
No. 316,239. Patented Apr. 21, 1885.
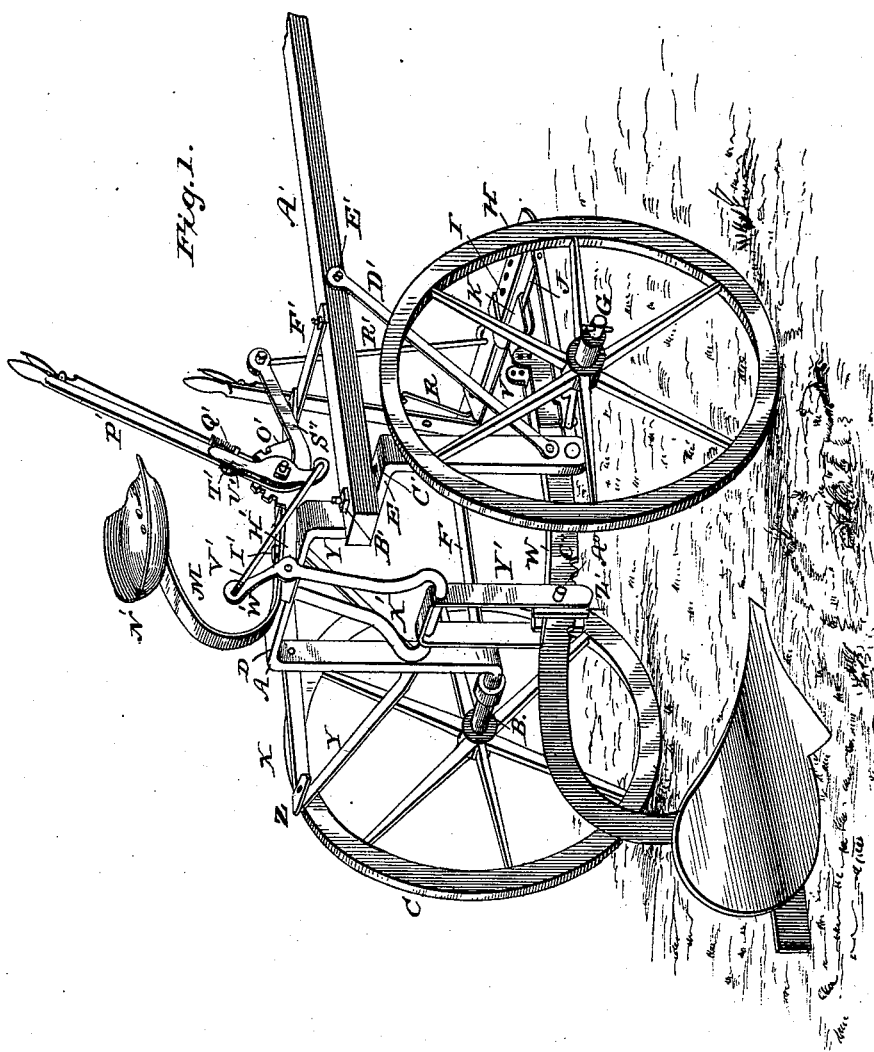
WITNESSES:
Patrick Clines,
INVENTOR.
By Louis Bagger & Co.
ATTORNEYS.

(No Model.) 3 Sheets—Sheet 2.
P. CLINES.
SULKY PLOW.
No. 316,239. Patented Apr. 21, 1885.
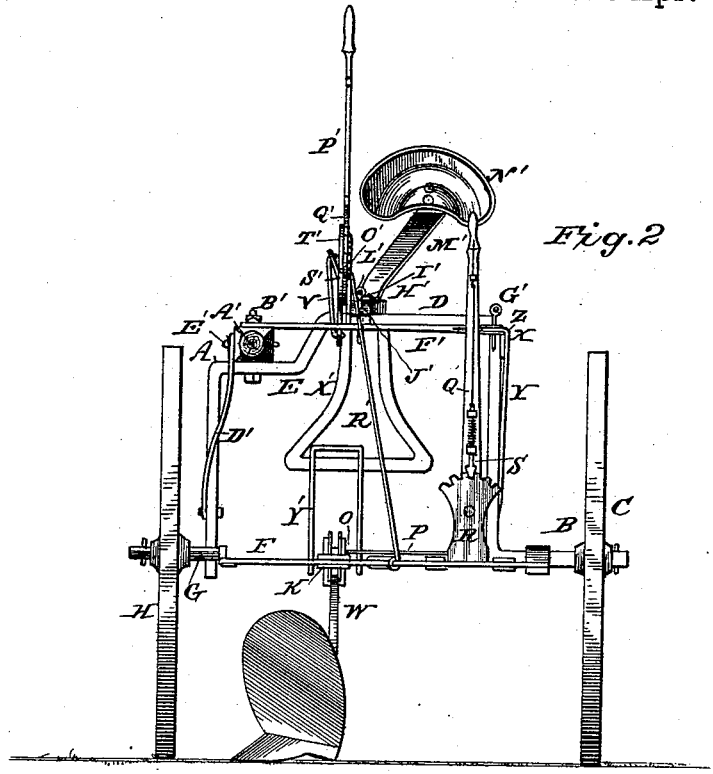
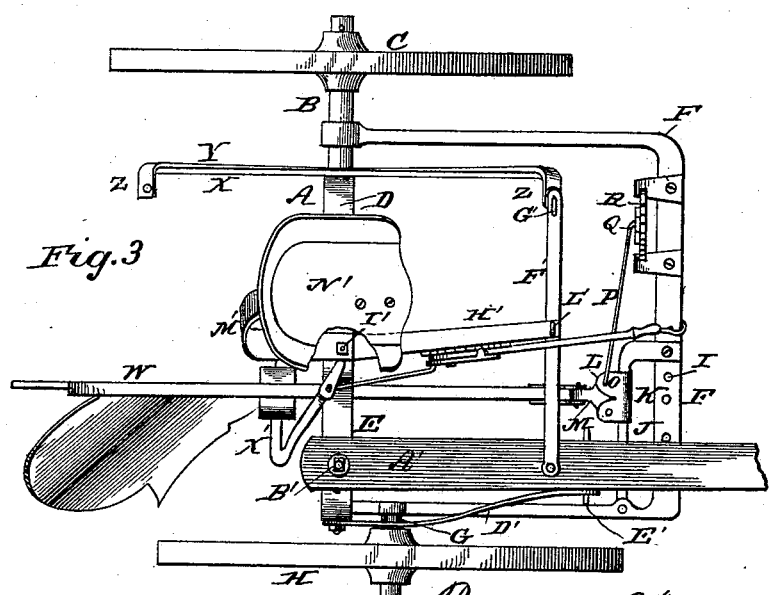
WITNESSES:
Patrick Clines,
INVENTOR.
By Louis Bagger & Co.
ATTORNEYS.

(No Model.) 3 Sheets—Sheet 3.

P. CLINES.
SULKY PLOW.

No. 316,239. Patented Apr. 21, 1885.

WITNESSES:
Fred. G. Dieterich
Wm Leclu

INVENTOR.
Patrick Clines,
By Louis Bagger & Co
ATTORNEYS.

UNITED STATES PATENT OFFICE.

PATRICK CLINES, OF MARTINSBURG, MISSOURI.

SULKY-PLOW.

SPECIFICATION forming part of Letters Patent No. 316,239, dated April 21, 1885.

Application filed January 30, 1885. (No model.)

*To all whom it may concern:*

Be it known that I, PATRICK CLINES, a citizen of the United States, residing at Martinsburg, in the county of Audrain and State of Missouri, have invented certain new and useful Improvements in Sulky-Plows; and I do hereby declare that the following is a full, clear, and exact description of the invention, which will enable others skilled in the art to which it appertains to make and use the same, reference being had to the accompanying drawings, which form a part of this specification, and in which—

Figure 4:
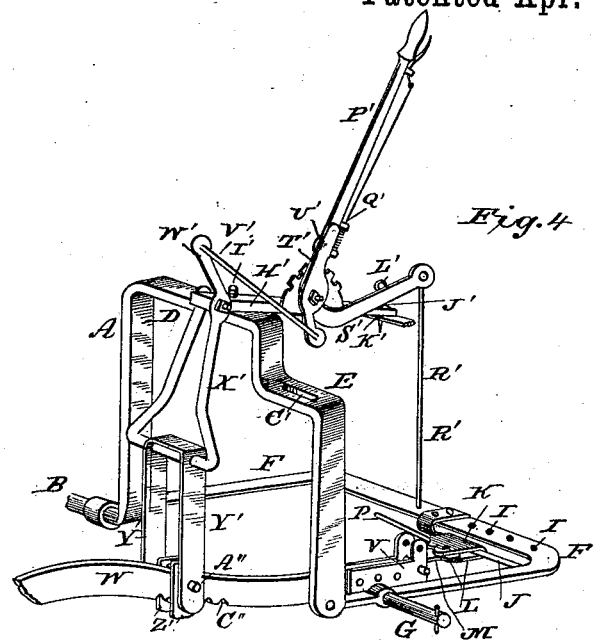
Figure 5:
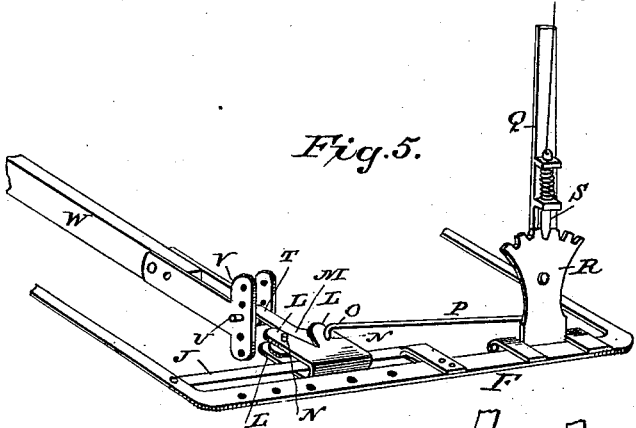
Figure 6:
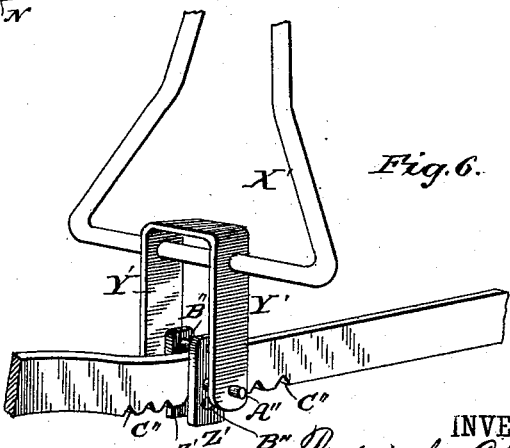

Figure 1 is a perspective view of my improved reversible sulky-plow. Fig. 2 is a front view of the same. Fig. 3 is a top view. Fig. 4 is a perspective detail view of the mechanism for raising and lowering the plow. Fig. 5 is a similar view of the mechanism for regulating the width of the furrow, and Fig. 6 is a similar view of the clip securing the plow-beam and of a portion of the beam.

Similar letters of reference indicate corresponding parts in all the figures.

My invention has relation to sulky-plows; and it consists in the improved construction and combination of parts of a plow having means for reversing it, so as to adapt it to be used with either a right or left hand plow, and in which the plow may be adjusted from the driver's seat to plow at any desired depth or width by simple and efficient means, as hereinafter more fully described and claimed.

In the accompanying drawings, the letter A indicates an arched axle formed with a stub-axle, B, at one end for the land-wheel C, and with one portion, D, of its arched portion raised above the other part, E, forming a step or offset.

A draft-bail, F, is hinged to the stub-axle at the land side and to the lower end of the furrow side of the axle, and has near the point of attachment at that side a stub-axle, G, upon which the furrow-wheel H is journaled. The forward side of the draft-bail has a number of perforations, I, at the furrow end of that side, which form a clevis for the attachment of the team, and a bar, J, is secured to the bail parallel with the forward side of the same at that end, and has a clip, K, sliding upon it, which clip has two rearwardly-projecting lips, L, between which a plate, M, fits, the said lips and plate having registering perforations N, one at each end, into which perforations the hooked end O of an arm, P, may be inserted, securing the plate between the lips. This arm P is pivoted to the lower end of a hand-lever, Q, pivoted at the center of a plate, R, secured pivotally upon the forward side of the draft-bail, and having a notched segment at its upper end, which segment is engaged by a spring-latch, S, upon the lever, and the segmental plate may be tilted to project from either the upper or lower side of the forward side of the draft-bail.

The rear edge of the plate M is provided with an eye, T, which is secured by means of a bolt, U, to the clevis V of the plow-beam W, and the depth of the furrow may be adjusted by adjusting the said eye in the clevis.

At the upper end of the portion of the arched axle, which is at the land side of the plow, is secured a bar, X, projecting forward and rearward, and the ends of this bar are braced by means of inclined braces Y, the ends of which are bent over the ends of the bar and form inwardly-projecting perforated lips Z.

The inner end of the tongue A' is pivoted to swing in a horizontal plane upon a bolt, B', which slides adjustably in a slot, C', in the lower portion of the arched axle, and the tongue is braced by a brace-bar, D', which is pivoted to the lower end of the furrow side of the arched axle and movably connected to the tongue some distance from its pivot by means of a bolt, E'.

An arm, F', is pivoted at one end upon the upper side of the tongue, and has its other end perforated for the passage of a bolt, G', by means of which that end may be secured to one of the perforated lips Z of the braces for the longitudinal bar.

The seat-support is pivoted upon the higher portion of the arched axle, and consists of a bar, H', pivoted upon the axle upon a bolt, I', so as to swing in a horizontal plane, and having a perforation, J', in its end, which registers with a perforation, K', in the middle of the arm F', into which perforations a bolt, L', may be inserted, which will secure the end of the bar to the arm.

The curved seat-supporting spring M' is secured to the rear end of the bar, and the said spring is curved slightly toward land, so as to place the seat N' of the driver toward land.

A notched segment, O', is secured upon the side of the arm H', and a bent lever, P', is pivoted at its bend in the center of this segment, having a spring-latch, Q', and a connecting-rod, R', is detachably pivoted in a perforation at the end of the short arm S' of the lever at one end, while the other end is hinged to the forward side of the draft-bail, so that by tilting the hand-lever back the forward side of the draft-bail may be raised.

A short lever, T', is pivoted outside of the hand-lever in the center of the segment, and has at its upper end a catch, U', which engages the long arm of the hand-lever when the latter is tilted back, and a short connecting-rod, V', is pivoted to the lower end of the short lever and to the forward end of a curved lever, W', which is pivoted at its curve upon the side of the rear end of the seat-supporting bar, and which has its rear arm forming a stirrup, X', upon the horizontal portion of which stirrup the upper perforated and connected ends of a bail, Y', slide, having their lower ends perforated.

Two short plates, Z', having outwardly-projecting bolts or lugs A'' at their middles, turn with the said lugs in the perforated lower ends of the bail, and the ends of these plates are perforated and have transverse bolts B'', which confine the plow-beam, which is thus secured between the two plates.

The lower edge of the plow-beam has a number of transverse notches, C'', which ride upon the lower bolt, and by adjusting the plates so that the bolt rests in a notch farther forward or rearward the forward or rear end of the plow will be more or less elevated.

It will be seen that the width of the furrow may be regulated by means of the lever Q, which rocks transversely, and which will slide the plate secured to the plow-clevis and the clip upon the bar running parallel with the forward side of the draft-bail, and the depth of the furrow may be regulated by tilting the hand-lever P', tilting the lever forward, causing the plow to run deeper, while tilting it rearward will cause the plow to run shallow, or to be entirely raised out of the furrow, the lever engaging the catch upon the short lever T' and tilting the same back with it.

When it is desired to simply let the plow run out of the ground without raising the plow, the hand-lever may be drawn in so as to pass the catch upon the short lever, when it will simply raise the forward side of the draft-bail and the forward end of the plow-beam, thus allowing the plow to run to the surface of the ground of its own accord, and it will be seen that as the forward end of the draft-bail is raised or lowered, raising or lowering the end of the plow-beam, the wheel running in the furrow will be raised or lowered in proportion to the same, so that the plow will always run level without any separate adjustment for the furrow-wheel.

When the sulky-frame is to be reversed, so as to adapt it to be used with a plow turning the sod to the side opposite to that to which the frame is adjusted, the brace for the tongue is removed from the bolt upon the tongue, when the tongue may be turned, the bolts confining the end of the bar or arm F' to the lip Z and the bar H' to the arm F' being removed, and after turning the tongue the seat-support, with its accessories, may be turned upon its pivot, the draft-bail swung downward under the plow, and all parts being thus reversed they may again be secured with their respective bolts, and the plow secured in the same manner as the former plow was secured to the frame in the former position.

Having thus described my invention, I claim and desire to secure by Letters Patent of the United States—

1. The combination of the arched axle having the land-wheel journaled at one side, the draft-bail hinged at its rear ends to the ends of the axle, having the plow attached to it at its forward end, and having the stub-axle near the rear end of the furrow side of the bail, carrying the furrow-wheel, and means, substantially as shown, for raising or lowering the forward end of the bail, as and for the purpose shown and set forth.

2. The combination of the arched axle having one part of its horizontal portion higher than the other, and having a longitudinal bar having inwardly-projecting perforated lips at its ends, secured at its middle to the upper end of the land side of the axle, the draft-bail hinged at its rear ends to the lower ends of the axle so as to swing under the same, and having the forward end of the plow-beam secured to it, the seat-support having the perforated forward end, and carrying the seat and the plow-raising levers, and pivoted at its rear end upon the highest portion of  arched axle, the tongue pivoted at its rear end upon the lower part of the arched axle, the brace secured movably to the tongue, and pivoted to the lower end of the furrow side of the axle, and the arm pivoted upon the upper side of the tongue, and having perforations provided with bolts corresponding to the perforations in the forward end of the seat-supporting bar and to the perforated lugs at the ends of the longitudinal bar, as and for the purpose shown and set forth.

3. The combination of the draft-bail having bar J, the clip K, sliding upon the bar, and having the forward end of the plow-beam secured to it, the hand-lever Q, pivoted upon the draft-bail, and the arm P, pivoted to the plate and to the lower end of the hand-lever, as and for the purpose shown and set forth.

4. The combination of the hand-lever P', the connecting-rod R', the short lever T', having the catch U', and pivoted concentric with the hand-lever, the short connecting-rod V', and the rear plow-raising lever, W', as and for the purpose shown and set forth.

5. The combination of the bail Y', connected to the plow-raising mechanism, and having the perforations at its lower ends, the plates Z', having perforated ends, and having the lugs A'' pivoted in the perforations of the bail, the bolts B'', and the plow-beam having the transverse notches C'' in its lower edge, as and for the purpose shown and set forth.

In testimony that I claim the foregoing as my own I have hereunto affixed my signature in presence of two witnesses.

PATRICK CLINES.

Witnesses:
JOHN DONNELLY,
JOHN W. MARTIN.